United States Patent [19]

Ramamurthy

[11] Patent Number: 4,611,998
[45] Date of Patent: Sep. 16, 1986

[54] SIMULATOR FOR TEACHING NEONATAL RESUSCITATION

[75] Inventor: Rajam S. Ramamurthy, San Antonio, Tex.

[73] Assignee: Board of Regents, University of Texas System, Austin, Tex.

[21] Appl. No.: 214,437

[22] Filed: Dec. 8, 1980

[51] Int. Cl.⁴ .............................................. G09B 23/32
[52] U.S. Cl. .................................................... 434/265
[58] Field of Search ........................................ 434/265

[56] References Cited

U.S. PATENT DOCUMENTS 3,562,924  2/1971  Baerman .
3,572,317  3/1971  Wade .
3,736,362  5/1973  Laerdal .
3,872,609  2/1975  Smrcka .
4,001,950  1/1977  Blumensaadt .

OTHER PUBLICATIONS

AMBU Cardiopulmonary Resuscitation Training Manikin, Marion Health and Safety, Inc. Rockford, Illinois, 6 pages.
CPR Billy No. 110, Manufactured by Simulaids, 270 Tinker St., Woodstock, N.Y. 12498, p. 6 of 1978 Catalog.
Med-E-Train, Simulaids Catalog for 1978, pp. 14, 15.
*Simulaids* product catalog; Simulaids, Inc., Woodstock, New York, pp. 6, 14 and 15.

*Primary Examiner*—Harland S. Skogquist
*Attorney, Agent, or Firm*—Arnold, White & Durkee

[57] ABSTRACT

An infant-sized mannequin is provided for use in training or practicing cardiopulmonary resuscitation involving synchronized insufflation and external cardiac massage manipulations. The mannequin is provided with lung-simulating structure, including a pressure switch transducer actuated by insufflations applied to the mannequin and producing an electrical signal indicative of the rate and pressure of the applied insufflations. The mannequin is also provided with a plunger mechanism actuatable by cardiac massage manipulations applied to the mannequin. The plunger mechanism in turn actuates a potentiometer transducer which produces an electrical signal indicative of the rate and depth of cardiac massage. The electrical signals are conveyed by wire connections to a recorder producing separate record traces of cardiac massage action and insufflation, for providing a visual record of the several CPR parameters indicative of the performance skill of one performing CPR on the mannequin.

17 Claims, 7 Drawing Figures

SIMULATOR FOR TEACHING NEONATAL RESUSCITATION

BACKGROUND OF THE INVENTION

The present invention relates to cardiopulmonary resuscitation (CPR) teaching apparatus; and more particularly, it relates to a simulator for teaching neonatal CPR resuscitation.

In many emergency medical situations, such as heart attack, stroke, electrical shock, drowning, etc., there is the need to perform cardiopulmonary resuscitation (CPR) in an effort to revive the accident victim. CPR, however, requires correctly applied and synchronized insufflations and external heart massage. Unless properly performed, CPR is not only ineffective, but can cause further injury to the victim. Heart massage action must be applied at the proper point on the chest, with the appropriate force magnitude, and at the appropriate rate. Applied insufflations must be at the appropriate rate and air pressure. Accordingly, proper CPR technique should be learned before it is attempted on someone.

In order to facilitate the teaching and practicing of CPR, adult-sized mannequin simulators have been developed. In learning CPR, it is important to be able to evaluate various resuscitation parameters, including: the adequacy of insufflation, the rate at which breathing and cardiac compressions are performed, and the ratio of breathing to compressions. Accordingly, the simulators are provided with mechanisms imitating respiratory organs and registering chest compressions, which are mounted inside the thorax of the mannequin. A recording device for making a written record reflective of the resuscitation parameters during a training exercise on the simulator is also mounted in the thorax of the mannequin. The recording device is mechanically coupled to the mechanisms and is operated in response to movement of the mechanisms during insufflation and heart massage. Representative of this type of mannequin CPR simulator is the apparatus shown and described in Laerdal, U.S. Pat. No. 3,736,362 issued May 29, 1973.

While most often CPR will be performed on adults and adolescents, there are instances in which newborn babies and young infants require CPR. Adult-sized mannequin simulators are not altogether satisfactory in teaching neonatal resuscitation. At most, the mannequin simulator torso is provided with a spring tension metal band of adjustable stiffness to simulate patients of various ages. This arrangement does not accurately simulate an infant and is not totally satisfactory for teaching neonatal resuscitation.

Clearly, an infant-sized mannequin simulator would be advantageous in teaching neonatal CPR. However, the limited internal volume of the chest of an infant mannequin prevents the mounting therein of mechanisms and recording devices as found in adult-sized mannequin simulators. Accordingly, infant simulators heretofore known have included either no provision for evaluating CPR parameters or merely provided an aneroid-like device to indicate heart compressions.

SUMMARY OF THE INVENTION

Recognizing the need for an improved mannequin simulator for teaching and practicing cardiopulmonary resuscitation, particularly one suitable to simulate neonatal resuscitation and provide for the evaluation of several of the parameters thereof, a feature of the present invention is the provision of transducers in the chest cavity of a mannequin, for producing electrical signals indicative of several CPR parameters, and a recorder located externally of the mannequin, for receiving the electrical signals and producing a record of the performance skill of one applying CPR to the mannequin.

An additional feature of the invention is the provision of an infant-sized mannequin CPR simulator which provides for the evaluation of several CPR parameters. The mannequin simulator includes lung-simulating structure which presents the normal resistance of infant lungs and produces a rise and fall of the chest wall. The mannequin also includes a mechanism simulating the position of the heart.

A further feature of the invention is the provision of a pressure transducer actuatable by applied insufflations, which produces an electrical signal indicative of the rate and pressure of the insufflations.

A yet further feature of the invention is the provision of a plunger mechanism actuating a potentiometer, to indicate the rate and depth of cardiac massage.

Still another feature of the invention is the provision of a simulated trachea within the mannequin, defining an air passageway to the imitation respiratory organ. The simulated trachea is manipulated in response to tilting of the mannequin head to open and close the air passageway.

The present invention may be summarized in that an improved CPR mannequin training simulator, permissibly of infant size, includes means disposed in the mannequin chest cavity for responding to external cardiac massage manipulations applied to the mannequin, the means being responsive to both the rate and depth of the cardiac massage. A transducer actuated by the cardiac massage responsive means produces an electrical signal indicative of the rate and depth of the cardiac massage. An inflatable, saccular bag in the chest cavity receives air from insufflations applied to the mannequin and produces a rise and fall of the chest wall. A transducer actuated by applied insufflations produces an indication of the rate and pressure of the insufflations. A recorder located externally of the mannequin receives the electrical signals produced by the transducers and makes a record of the indicated CPR parameters. The transducer signals are received by the recorder by means for conveying the electrical signals from the transducers inside the mannequin to the external recorder.

BRIEF DESCRIPTION OF THE DRAWINGS

A written description setting forth the best mode presently known for carrying out the present invention, and of the manner of implementing and using it, is provided by the following detailed description of a preferred embodiment illustrated in the attached drawings in which.

DETAILED DESCRIPTION OF AN ILLUSTRATIVE EMBODIMENT

Figure 1:
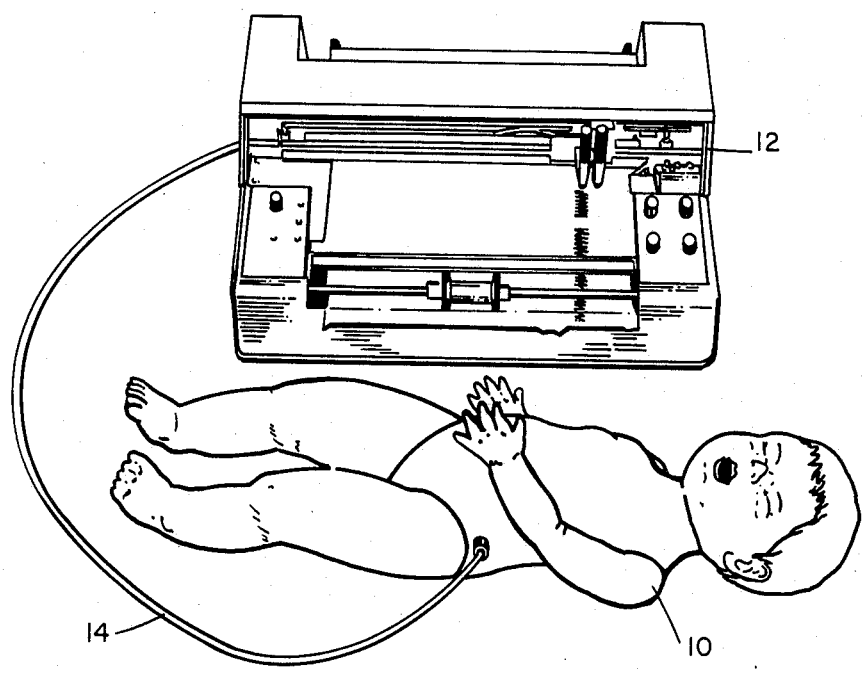
FIG. 1 is a pictorial representation of an infant-sized mannequin and an interconnected recorder, which comprise the cardiopulmonary resuscitation training simulator of the present invention.

Referring to FIG. 1, cardiopulmonary resuscitation training simulator apparatus in an embodiment in accordance with the present invention includes an infant-sized mannequin 10 and a recorder 12 located externally of the mannequin. In response to cardiac massage manipulations and insufflations applied to the mannequin, electrical signals indicative of several cardiopulmonary resuscitation parameters are produced and conveyed to recorder 12 by means of wired connection 14. Recorder 12 produces a visual record of the CPR parameters.

The CPR parameters of primary interest are the rate and depth of cardiac massage and the rate and pressure of insufflations. Preferably, analog electrical signals are produced to indicate these parameters. Accordingly, recorder 12 may suitably be a dual-trace strip chart recorder. Such a recorder will serve to make a written record of a CPR training exercise.

One suitable recorder is an Omniscribe Recorder Model No. B 5237-2 by Industrial Scientific, Inc. Recorder 12 may comprise devices other than strip chart recorders. For example, the analog electrical signals provided over wire connection 14 may be applied to analog-to-digital conversion devices and the CPR parameter information stored as digital data. In such an implementation, the data may be displayed on a digital numeric readout. Furthermore, digital data reflective of the measured parameters of a CPR training exercise may be compiled into a computer summary report or detailed analysis of the performance of skill of a person during a CPR training exercise.

Figure 2:
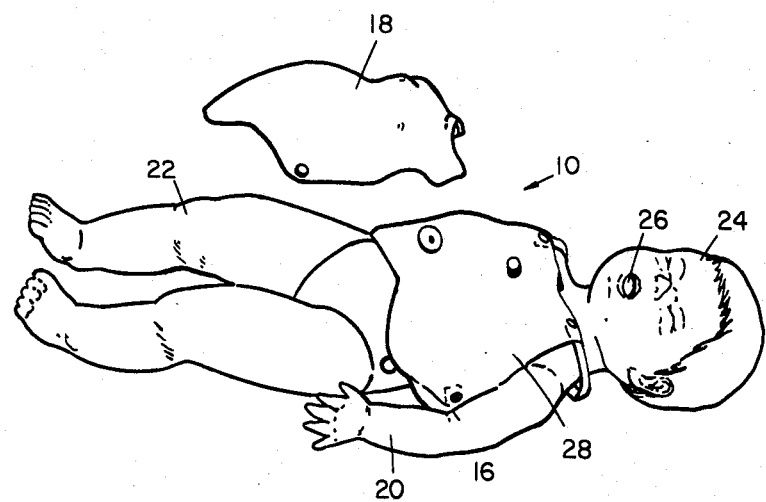
FIG. 2 is a pictorial representation of the infant mannequin having the chest wall removed to expose an inflatable plastic bag portion of the lung-simulating structure.

Referring next to FIG. 2, the infant mannequin is illustrated in greater detail. Suitably, the mannequin body used may be that of a CPR No. 110 manufactured, by Simulaids, 270 Tinker St., Woodstock, N.Y. 12498; although any suitable infant-sized doll with adequate space in the chest and abdomen and that has a removable head can be used. The ameroid apparatus of the simutator is, of course, removed. The mannequin body is approximately 25 inches in length and only about 8 inches wide through the shoulders. It includes a torso 16 having a chest cavity covered by a removable chest wall 18. Arm and leg limbs 20, 22 are also connected to the torso. A head 24 having an open mouth 26 is attached to torso 16, and preferably is provided with tilting movement at the neck with respect to the torso. In FIG. 2, chest wall 18 is removed from torso 16 to reveal a portion of the lung-simulating structure in the form of an inflatable plastic bag 28. As will be explained in more detail, insufflations applied to mannequin 10 through open mouth 26 inflate plastic bag 28 and produce a rise and fall of chest wall 18.

Figure 3A:
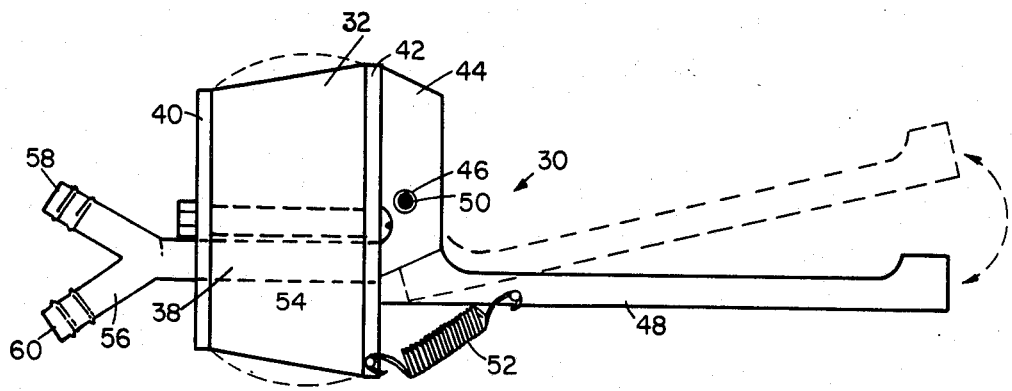
FIGS. 3a and 3b illustrate the structure of a simulated trachea used in the infant mannequin for conducting air insufflations from the infant mannequin head to the lung-simulating structure.
Figure 3B:
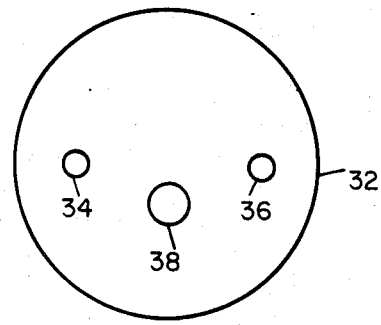

The air of applied insufflations is conducted from the mouth of the mannequin to the inflatable plastic bag by trachea-simulating structure shown in FIG. 3. Referring to FIG. 3, the simulated trachea 30 in the illustrative embodiment being described herein is suitably constructed of a rubber stopper 32. The stopper is provided with three bored holes 34, 36 and 38. Suitably, rubber stopper 32 is a No. 10 stopper. Holes 34 and 36 are bored through the stopper at a radius of 0.687 inch on center at a hole diameter of 150 inch. Hole 38 is bored through the stopper at a 0.312 inch radius at 90° to holes 34 and 36, and is ¼ inch in diameter. A base retaining plate 40 is placed in abuttment with the smaller diameter end of the tapered rubber stopper 32. Plate 40 is suitably of 1⅜ inch diameter and 1/16 inch thick, and is machined from aluminum stock. Plate 40 has three holes corresponding to the holes in the rubber stopper. Two holes, those corresponding to holes 34 and 36 in stopper 32, are tapped to form threaded holes. The third hole is drilled through with a ⅜ inch diameter.

A top plate 42 having three holes corresponding to the holes in the rubber stopper 32 is placed in abuttment with the larger diameter end of the tapered rubber stopper 32. Suitably, plate 42 is 1.920 inches in diameter and ⅛ inch thick. Plate 42 is also machined from aluminum stock. Machined as a part of plate 42 is a journal block 44. A slot (not in view) is cut into journal block 44 and aligned hinge pin openings 46 are drilled through portions of block 44 on each side of the slot.

An L-shaped hinge arm 48 is inserted in the slot in journal block 44. A hinge pin 50, the ends of which are supported in openings 46, has arm 48 mounted thereon for pivotal movement as indicated by the dashed lines which indicates the L-shaped arm at the other extreme of its range of pivotal movement. A spring 52 connected between arm 48 and plate 42 provides a yieldable restraining force to maintain arm 48 in the non-pivoted position indicated in FIG. 3a.

Hinge arm 48 is so positioned by the location of hinge pin 50 in journal block 44 that, when in the non-pivoted position indicated, a portion thereof closes over hole 38 in stopper 32. However, when hinge arm 48 is pivoted to the other extreme of its pivotal range of movement, as shown by the dashed lines, hole 38 is opened.

The assembly comprising stopper 32, plate 40 and plate 42 is held together by threaded fasteners 54 which are inserted through holes 34 and 36 in stopper 32 and the corresponding holes in plates 40 and 42.

The simulated trachea structure is completed by a Y tube 56 inserted through plate 40 into hole 38 in stopper 32, i.e., the air exit side of the defined air passageway.

Trachea-simulating structure 30 is placed in the neck section of mannequin 10 with fasteners 54 when tightened forcing rubber stopper 32 to expand and form an airtight fit. The mannequin head 24 is then assembled onto the neck of the mannequin with the distal end of hinge arm 48 protruding into the interior cavity of the mannequin head. When head 24 is tilted to simulate clearing of the trachea, the distal end of the hinge arm contacts the forehead and is caused to pivot. This opens hole 38 in stopper 32 and permits air introduced through the mouth 26 of the mannequin head to pass from there to outlet ports 58 and 60 of Y tube 56. Outlet port 58 directs air to the inflatable plastic bag 28, and outlet port 60 directs air to an air pressure transducer to be described.

Figure 4:
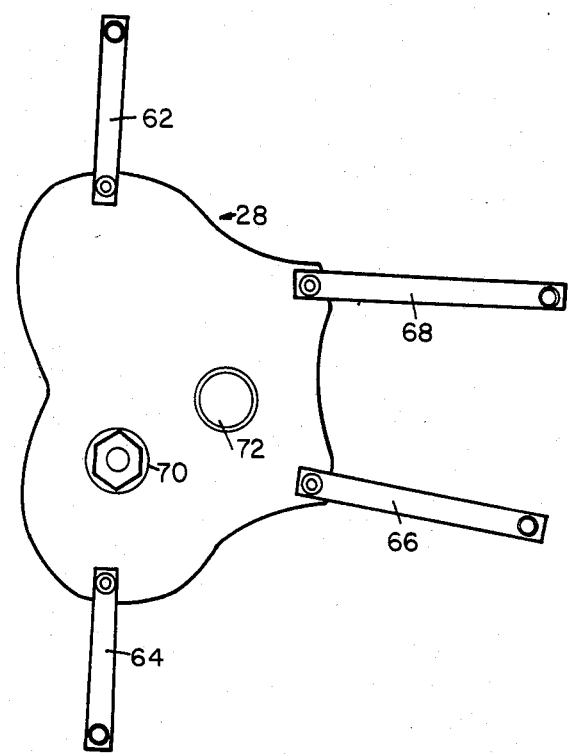
FIG. 4 is a detailed illustration of the inflatable plastic bag shown in FIG. 2.

Referring now to FIG. 4, inflatable plastic bag 28 comprises two sheets of plastic which are heat-sealed along their periphery to form an envelope structure. Elastic strips 62, 64, 66 and 68, each of which is provided with snaps, provides a means of attaching the inflatable plastic bag to the mannequin. A rubber tubing clamp 70 provides a means of interconnecting the inflatable plastic bag to the trachea-simulating structure shown in FIG. 3a. An exhaust opening 72 is provided in bag 28 to provide a means of expelling air from bag 28.

Figure 5:
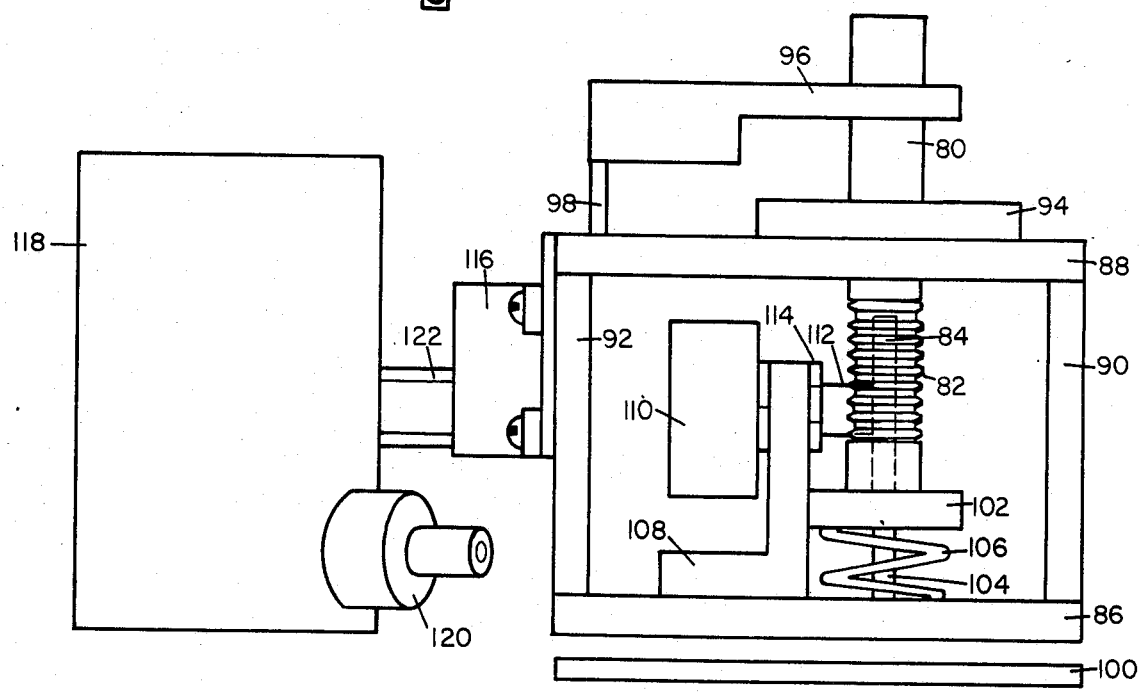
FIG. 5 is a diagram of the mechanical assembly of the heart organ simulator, together with an air pressure transducer assembly for registering applied insufflations.

Referring now to FIG. 5, the mechanical assembly of the heart organ position simulator, together with an air pressure transducer assembly for registering applied insufflations are diagrammed. The heart organ simulator generally comprises a mechanism for translating externally applied cardiac massage manipulations into a detectable physical response from a transducer. In the illustrative embodiment being described herein, the form of the means disposed in the chest cavity for responding to external cardiac massage manipulations applied to the mannequin, which means is responsive to both the rate and depth of the cardiac massage, is a plunger assembly. The transducer, producing an electrical signal indicative of the rate and depth of the cardiac massage, is implemented with a potentiometer, the wiper of which is mechanically coupled to the cardiac massage responsive means via a coupling gear arrangement.

The plunger assembly comprises a vertically oriented plunger shaft 80. Over a lower portion of shaft 80 are splines 82 or gear teeth for engagement with a spur gear 84 shown in outline. Plunger shaft 80 is carried in a frame which includes a base plate 86 and a top plate 88, which have extending between them at each corner posts, e.g., 90 and 92, fastened in position by machine screws. A plate 94 is mounted on top of plate 88 of the frame. In the center of plate 94 is a bored opening. From the center of this opening and on radius are mounted four bearings (not shown) which are positioned 90° apart. The bearings provide minimum surface contact with plunger shaft 80 at four points, thereby reducing friction to a minimum.

Mounted to the upper end of the plunger shaft above plate 94 is a plate 96. A guide pin 98 extends vertically from the top side of plate 88 and is received within an opening through plate 96. The engagement of guide pin 98 and plate 96 prevents plunger shaft 80 from rotating. Further, plate 96 provides a flat surface with which to contact the inside of the chest wall, and also defines the position at which the fingers of a simulator user should be placed on the chest wall for proper cardiac massage.

A plate 100 having a plurality of holes for receiving threaded fasteners serves as a back-up to base plate 86. Base plate 86 and back-up plate 100 provide a means for mounting the heart organ simulating structure to the mannequin, and for holding the structure in position in the chest cavity.

Formed at the bottom end of plunger shaft 80 is an enlarged diameter portion 102. The enlarged portion 102 at the end of shaft 80 has a recessed opening therein for receiving the upper end of coil spring 106. The bottom of spring 106 sets itself in a grove (not shown) cut in the top surface of base plate 86. In the center of the portion 102 and extending into shaft 80 is a brass insert (not shown). A hole drilled in the brass insert accepts a guide pin 104 mounted in base plate 86. The guide pin assists in maintaining the accurate vertical orientation of shaft 80.

Mounted adjacent plunger shaft 80 and on plate 86 is an angle bracket 108. To this angle bracket is mounted a potentiometer transducer 110. The shaft 112 of potentiometer 110, which drives the internal wiper contact of the device, extends through bracket 108 and has spur gear 84 mounted thereon. Potentiometer 110 is mounted to bracket 108 in a conventional fashion with a nut 114 being placed onto the threads of a sleeve formed on the body of the potentiometer transducer.

As will be appreciated, by mounting the heart organ simulating structure shown in FIG. 4 within the chest cavity of the mannequin, plunger shaft 80 will be responsive to cardiac massage manipulations applied to the exterior of the mannequin chest wall. The cardiac massage manipulations will produce vertical movement of plunger shaft 80 against the yieldable resistance of spring 106. By reason of the gear coupling between plunger shaft 80 and potentiometer shaft 112, the resistance value exhibited by potentiometer transducer 110 will fluctuate in accordance with the rate and depth of the cardiac massage. With potentiometer transducer 110 connected to a source of electrical power, an electrical signal will be produced at the wiper contact which is indicative of the rate and depth of the cardiac massage.

Suitably, potentiometer transducer 110 may be a 0.1 Megaohm, Type J potentiometer. Also, spur gear 84 may suitably be a Boston gear G-144, 48-pitch, 14½° pressure angle with 60 teeth. Correspondingly, splines 82 on plunger shaft 80 may be machine-formed, 48-pitch gear teeth, of which there may suitably be a total of 12 teeth.

With regard to the physical size of the heart organ simulating structure, the frame (comprising plates 86 and 88, and the corner posts) may suitably have the dimensions of 3½ inches × 3 inches × 2 inches.

Plunger shaft 80 may suitably be fabricated from stainless steel and be machined to various cross-sectional diameters. A first diameter of shaft 80 is 0.480 inch, which extends 1⅝ inches from the upper end. The next diameter is ½ inch over a 1¼ inches long segment. Of this length, 13/16 inch is suitably machine-formed gear teeth. The diameter of portion 102 is suitably 0.875 inch and is 0.2 inch long.

Plate 96 may suitably have the dimensions of 2-7/16 inches by 1½ inches. Angle bracket 108 may suitably be 1½ inches high and 1 inch wide, with a base 1 inch square and a web thickness of ¼ inch.

Lung-simulating structure disposed in the chest cavity for receiving insufflations applied to the mannequin in addition to bag 28 further includes a transducer actuated by insufflations applied to the mannequin, for producing an electrical signal indicative thereof. In the illustrative embodiment being described herein, the transducer is a microswitch pressure transducer. The transducer is designated in FIG. 4 by reference numeral 116, and is shown mounted to the frame of the heart organ simulating structure. A portion of the insufflations applied to the mannequin are made available from outlet port 60 of the trachea-simulating structure in FIG. 3a. It is the air from outlet port 60 which is applied to air pressure transducer 116. However, interposed between outlet port 60 of the trachea-simulating structure and transducer 116 is a cylinder 118 having fittings 120 and 122 which form inlet and outlet openings to the internal volume of the cylinder. A piece of rubber tubing (not shown) interconnects fitting 120 with outlet port 60 of Y tube 56 in FIG. 3a. The cylinder 118 suitably is 2 inches O.D. with an I.D. of 1¾ inches. The length of the tube internally is 2¾ inches. The internal volume of cylinder 118 is 2.834 cubic inches. The fittings attached to cylinder 118 suitably have a ¼ inch diameter port opening size.

When air is forced into the head of mannequin 10 through the mouth and/or nostrils, air passes into the head cavity. Assuming the head is properly tilted to open the passageway through the trachea, the air of the applied insufflation is at least in part directed to cylinder 118. The air passes out of cylinder 118 to pressure transducer 116.

An electrical voltage is applied as an exciter voltage to tranducer 116. Suitably, transducer 116 may be a MICROSWITCH pressure transducer Model 112PC15A, gage type rated at 15 psi. With 8.41 volts applied to the transducer and with 0 psi applied, there is 1.08 volts output. Accordingly, a null adjustment is required to zero the recorder. Preferably, the recorder is calibrated to 40 centimeters of H₂O, or approximately 3 psi. This is approximately equal to the maximum amount of breath which should be applied to an infant.

Figure 6:
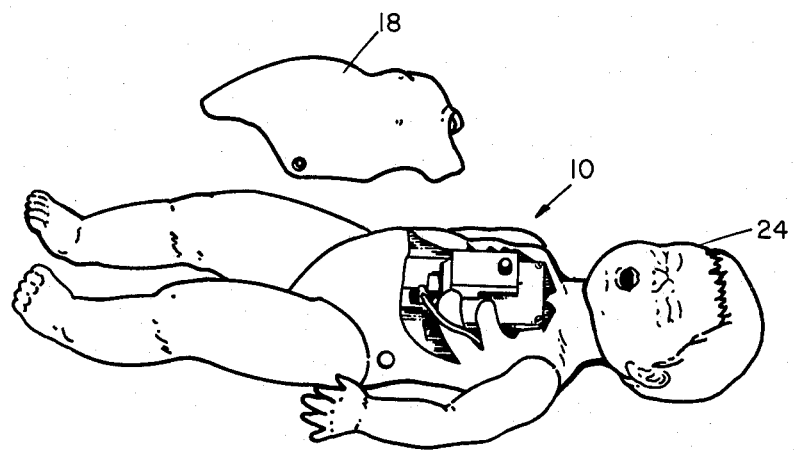
FIG. 6 is a pictorial representation of the infant mannequin with the chest wall and inflatable plastic bag removed to show placement of the heart organ simulator in the chest cavity of the mannequin.

Referring now to FIG. 6, mannequin 10 is shown with chest wall 18 and inflatable plastic bag 28 removed, thereby exposing to view the heart organ simulating structure and the lung-simulating structure. The plunger assembly is mounted within the chest cavity in a position placing the upper end of the plunger shaft at the position of the heart organ in an infant body. As explained previously, the frame in which the plunger assembly is mounted is firmly secured to the back of the mannequin using the back-up plate and screws previously described.

In use, head 24 of the infant mannequin is tilted to open the passageway through the simulated trachea. Insufflations applied to the mannequin through the open mouth and/or nose are directed into the lung-simulating structure. The inflatable bag portion of the lung-simulating structure produces a rise and fall of the chest wall. The air pressure transducer portion produces an electrical signal indicative of the insufflation air pressure, and, of course, indicates the frequency of repetition of applied insufflations.

Simultaneously with the application of insufflations to the mannequin, external cardiac massage manipulations are applied, which in accordance with proper CPR technique should be properly synchronized with the insufflations. The plunger mechanism is responsive to external cardiac massage in that down-stroking of the plunger assembly is produced. Translational movement of the plunger shaft produces a variation of the effective resistance of the potentiometer.

Suitably, the potentiometer transducer translates a down-stroke of the plunger shaft as an increase in resistance. Suitably, the potentiometer transducer is connected across a DC voltage supply, and the wiper contact is utilized as a variable voltage divider tap. In such an arrangement, a voltage will be developed on the wiper contact which is proportional to the mechanical positioning of the potentiometer shaft.

Alternatively, the potentiometer transducer may be utilized as a variable resistance element in an electrical circuit which produces an electrical signal proportional in current or voltage to the resistance value of the potentiometer transducer. In either case, the rate and depth of the cardiac massage will be translated by the plunger assembly and potentiometer transducer into an indicative electrical signal.

It will be appreciated that with the heart organ simulating structure and the lung-simulating structure combined with the infant-sized mannequin a cardiopulmonary resuscitation training simulator is provided which, despite its small physical size, provides for the measurement and recording of the CPR parameters of rate and depth of cardiac massage and rate and pressure of insufflation.

In the illustrative embodiment being described herein, the means for conveying the electrical signals from the transducers inside the mannequin to the external recorder is a wired interconnection. However, means to perform this function may be used. For example, the electrical signals may be converted to an optical signal by suitable transducers disposed internally of the mannequin. Fiber optic cables may then be utilized to convey the optical signal to an optical receiver interfaced to the recorder. Also, the transducer responses may be converted to a modulated radio frequency signal and transmitted to a radio frequency receiver interfaced to the recorder. Further, the transducer responses may be converted to modulated infrared radiation signals and transmitted to an infrared receiver over an optical communication path through free space, with the infrared radiation receiver being interfaced to the recorder.

Various other transducers may suitably be substituted for the potentiometer and microswitch pressure transducers disclosed herein. Particularly with respect to the potentiometer transducer, rather than a variable resistance device, a variable capacitance or inductance device could be utilized. Moreover, more sophisticated transducer elements such as strain gages, magnetic field detection devices, and optical detection could be utilized.

The mechanical plunger assembly which responds to cardiac massage manipulations applied to the chest wall may also be replaced by other apparatus. Readily apparent is the substitution of pivoted levers or other mechanical linkage arrangements. However, electro-optical apparatus disposed internally of the mannequin chest cavity for detecting deflections of the covering chest wall may also be utilized. For example, detection of the position of a light beam which moves in response to external cardiac massage could be implemented in lieu of the mechanical plunger assembly. Other schemes and structures may also be utilized.

The foregoing description of the present invention has been directed to a particular embodiment thereof for purposes of explanation and illustration. As already pointed out, however, it will be apparent to those skilled in this art that many modifications and changes in the embodiment shown may be made without departing from the teachings of the present invention. Accordingly, that subject matter which Applicant regards to be his invention is set forth in the following claims.

What is claimed is:

1. A neonatal cardiopulmonary resuscitation training simulator, comprising:

an infant mannequin including a torso defining a chest cavity covered by a chest wall, and a head attached to the torso having a mouth opening to an internal head cavity;

means disposed proximate the attachment point of the head and torso, for defining a simulated trachea in the mannequin to conduct the air introduced through the mouth opening during insufflation applied to the mannequin;

an inflatable, saccular bag structure disposed beneath the chest wall and interconnected with the trachea-simulating means to receive the air of applied insufflations for producing a rise and fall of the chest wall;

an air pressure transducer interconnected with the trachea-simulating means to receive air of applied insufflations, for producing a detectable response indicative of the rate and pressure of applied insufflations;

means disposed in the chest cavity, for responding to external cardiac massage manipulations applied to the chest wall;

a transducer actuated by the cardiac massage responsive means, for producing a detectable response indicative of the rate and depth of the cardiac massage; and a recorder located externally of the mannequin, for making a record of the rate and depth of cardiac massage and the rate and pressure of insufflation based upon the transducer responses.

2. The simulator of claim 1 wherein the air pressure transducer produces a detectable response in the form of an electrical signal indicative of the rate and pressure of applied insufflations.

3. The simulator of claim 1 wherein the transducer actuated by the cardiac massage responsive means comprises a potentiometer.

4. The simulator of claim 1 wherein the cardiac massage responsive means comprises a plunger mechanism actuatable by depression of the chest wall.

5. The simulator of claim 1 wherein the recorder comprises a strip chart recorder producing two adjacent traces, one reflective of cardiac massage manipulations applied to the mannequin and the other reflective of insufflations applied to the mannequin.

6. The simulator of claim 1 wherein the trachea-simulating means comprises a stopper block having a passageway opening therethrough and a Y-tube fitting inserted in the air exit side of the passageway.

7. A cardiopulmonary resuscitation training simulator, comprising:

a mannequin having a chest cavity covered by a chest wall;

means disposed in the chest cavity for responding to external cardiac massage manipulations applied to the chest wall;

said means being responsive to both the rate and depth of the cardiac massage;

a first transducer actuated by the cardiac massage responsive means, for producing an electrical signal indicative of the rate and depth of the cardiac massage;

lung-simulating structure disposed in the chest cavity for receiving insufflations applied to the mannequin, said lung-simulating structure including a second transducer actuated by insufflations applied to the mannequin, for producing an electrical signal indicative of the rate and pressure of the insufflations;

a recorder located externally of the mannequin, for receiving the electrical signals produced by the transducers and making a visual record thereof; and means for conveying the electrical signals from the transducers inside the mannequin to the external recorder.

8. The simulator of claim 7 wherein the mannequin is infant size.

9. The simulator of claim 7 wherein the cardiac massage responsive means comprises a plunger mechanism actuatable by depression of the mannequin chest wall.

10. The simulator of claim 7 wherein the first transducer comprises an electrical potentiometer.

11. The simulator of claim 7 wherein the lung-simulating structure further includes an inflatable, saccular bag operable to produce a rise and fall of the chest wall in response to insufflation applied to the mannequin.

12. The simulator of claim 7 wherein the second transducer comprises an air pressure switch.

13. A neonatal cardiopulmonary resuscitation training simulator, comprising:

an infant mannequin including a torso defining a chest cavity covered by a chest wall, and a head attached to the torso for tiltable movement at the neck and having a mouth opening to an internal cavity;

a simulated trachea disposed in the neck of the mannequin, for conducting from the head cavity air introduced therein during insufflation applied through the mouth opening, the simulated trachea including a stopper block having an air passage opening therethrough, means for splitting the air flowing through the passage opening into first and second flow line paths on the air exit side of the stopper block, and a hinged arm on the air entry side of the stopper block, the hinged arm being pivotal in response to tilting of the mannequin head from a first position wherein the air passage opening is covered to block air flow therethrough to a second position wherein the air passage opening is uncovered to admit air thereto;

means disposed in the chest cavity for responding to external cardiac massage manipulations applied to the chest wall, said means being responsive to both the rate and depth of the cardiac massage;

a transducer actuated by the cardiac massage responsive means, for producing an electrical signal indicative of the rate and depth of the cardiac massage;

an inflatable bag disposed beneath the chest wall, and having an air inlet coupled to the first flow line path on the air exit side of the stopper block to receive air of applied insufflations, for producing a rise and fall of the chest wall;

an air pressure transducer disposed in the chest cavity and having an air inlet coupled to the second flow line path on the air exit side of the stopper block to receive air of applied insufflations, for producing an electrical signal indicative of the rate and pressure of applied insufflations;

a recorder located externally of the mannequin, for receiving the electrical signals produced by the transducers and making a visual record thereof; and means for conveying the electrical signals from the transducers inside the mannequin to the external recorder.

14. The simulator of claim 13 wherein the transducer actuated by the cardiac massage responsive means comprises a potentiometer.

15. The simulator of claim 13 wherein the cardiac massage responsive means comprises a plunger mechanism actuatable by depression of the mannequin chest wall.

16. A cardiopulmonary resuscitation training simulator, comprising:

a mannequin having a chest cavity covered by a chest wall;

means disposed in the chest cavity for responding to external cardiac massage manipulations applied to the chest wall;

said means being responsive to both the rate and depth of the cardiac passage;

a first transducer actuated by the cardiac massage responsive means, for producing an electrical signal indicative of the rate and depth of the cardiac massage; and lung-simulating structure disposed in the chest cavity for receiving insufflations applied to the mannequin, said lung-simulating structure including a second transducer actuated by insufflations applied to the mannequin, for producing an electrical signal indicative of the rate and pressure of the insufflations.

17. The simulator of claim 16 wherein the lung-simulating structure further includes an inflatable bag disposed beneath the chest wall for producing a rise and fall of the chest wall in response to applied insufflations.

* * * * *

UNITED STATES PATENT AND TRADEMARK OFFICE
CERTIFICATE OF CORRECTION

PATENT NO. : 4,611,998
DATED : September 16, 1986
INVENTOR(S) : Rajam S. Ramamurthy It is certified that error appears in the above-identified patent and that said Letters Patent is hereby corrected as shown below:

Col. 3, line 46: after CPR insert --Billy--.

Col. 3, line 46: [,]

Col. 3, line 51: [simutator] --simulator--.

Col. 4, line 6 : [150] --.150--.

Col. 11, line 6: [passage] --massage--.

Signed and Sealed this

Sixteenth Day of December, 1986

Attest:

DONALD J. QUIGG

Attesting Officer        Commissioner of Patents and Trademarks